United States Patent [19]
Le Count et al.

[11] 3,864,390
[45] Feb. 4, 1975

[54] 1-FORMYLPHENOXY-3-AMINO-2-PROPANOL DERIVATIVES

[75] Inventors: David J. Le Count; Christopher John Squire, both of Macclesfield, England

[73] Assignee: Imperial Chemical Industries Limited, London, England

[22] Filed: June 29, 1972

[21] Appl. No.: 267,535

[30] Foreign Application Priority Data
July 28, 1971  Great Britain.................... 35480/11

[52] U.S. Cl...... 260/501.17, 260/566 F, 260/570.7, 424/316, 424/330
[51] Int. Cl........................................... C07c 95/08
[58] Field of Search..................... 260/501.17, 570.7

[56] References Cited
UNITED STATES PATENTS
3,501,769  3/1970  Crowther et al............... 260/501.17
3,663,607  5/1972  Barrett et al................. 260/570.7 X FOREIGN PATENTS OR APPLICATIONS
1,231,783  5/1971  Great Britain OTHER PUBLICATIONS
Layer, Chem. Reviews, Vol. 63, pages 490, 497 (1963).

*Primary Examiner*—Bernard Helfin
*Assistant Examiner*—Michael W. Glynn
*Attorney, Agent, or Firm*—Cushman, Darby & Cushman

[57] ABSTRACT

New 1-o-formylphenoxy-3-amino-2-propanol derivatives, a process for their manufacture and pharmaceutical compositions containing them. The compounds possess β-adrenergic blocking activity and are useful as intermediates. Representative of the compounds disclosed is 1-o-formylphenoxy-3-isopropylamino-2-propanol.

3 Claims, No Drawings

1-FORMYLPHENOXY-3-AMINO-2-PROPANOL DERIVATIVES

This invention relates to new aldehyde derivatives which possess valuable therapeutic properties.

In United Kingdom Specification No. 1,069,345 there are described and claimed alkanolamine derivatives of the formula:

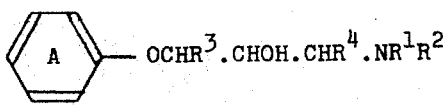

wherein $R^1$ stands for hydrogen, wherein $R^2$ stands for an alkyl radical of not more than 10 carbon atoms which is branched at the α-carbon atom, or for the 2-hydroxy-1,1-dimethylethyl or 1-methyl-3-phenylpropyl radical, wherein $R^3$ and $R^4$ may be, inter alia, hydrogen and where the benzene ring (A) may bear, inter alia, a single substituent in the 2-position only which is an alkanoyl radical containing not more than 10 carbon atoms, and the carboxylic esters thereof, and the salts thereof.

The only specific disclosure in said specification of an alkanoyl radical as a substituent in the benzene ring (A) is in respect of the acetyl radical, and in particular there is no specific disclosure of compounds wherein the alkanoyl radical is the formyl radical.

We have now found, and herein lies our invention, that compounds of the formula given above wherein the benzene ring (A) bears a formyl substituent in the 2-position have a very high level of β-adrenergic blocking activity, as determined by the inhibition of isoprenaline-induced tachycardia in cats.

This invention is a modification of and an improvement in the invention claimed in United Kingdom Specification No. 1,069,345.

According to the invention there is provided a new aldehyde derivative which is an alkanolamine derivative of the formula:

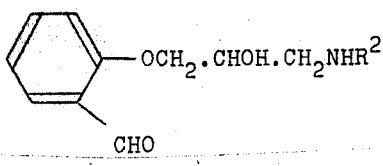

wherein $R^2$ has the meaning stated above, or an acid-addition salt thereof.

A suitable value for $R^2$ when it stands for an alkyl radical is, for example, the isopropyl, s-butyl or t-butyl radical.

It is to be understood that the alkanolamine derivative of the invention possesses an asymmetric carbon atom, namely the carbon atom of the —CHOH— group in the alkanolamine side-chain, and it may therefore be resolved into optically-active enantiomorphic forms. At least one, and possibly both, of these enantiomorphic forms will possess β-adrenergic blocking activity. It is to be understood, therefore, that this invention encompasses the racemic form of the alkanolamine derivative and any enantiomorphic form which possesses β-adrenergic blocking activity. It is to be understood that β-adrenergic blocking activity usually predominates in that enantiomorphic form which has the "S" absolute configuration of the said —CHOH— group.

A suitable acid-addition salt of the alkanolamine derivative of the invention is, for example, a salt derived from an inorganic acid, for example a hydrochloride, hydrobromide, phosphate or sulphate, or a salt derived from an organic acid, for example an oxalate, lactate, tartrate, acetate, salicylate, citrate, benzoate, β-naphthoate, adipate or 1,1-methylene-bis-(2-hydroxy-3-naphthoate), or a salt derived from an acidic synthetic resin, for example a sulphonated polystyrene resin, for example "Zeo-Karb" 225 ("Zeo-Karb" is a Trade Mark).

The alkanolamine derivative of the invention may be manufactured by any chemical process known to be suitable for the manufacture of analogous compounds.

Thus, for example, the alkanolamine derivative may be manufactured by the reaction of a compound of the formula:

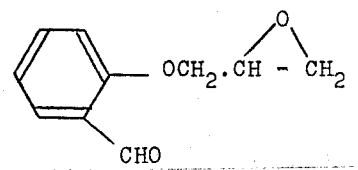

or a compound of the formula:

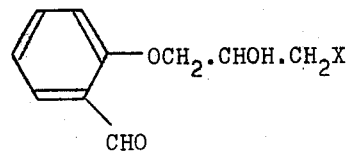

wherein X stands for a halogen atom, or of a mixture of both such compounds, with an amine of the formula $R^2NH_2$, wherein $R^2$ has the meaning stated above, followed by the hydrolysis of the compound of the formula:

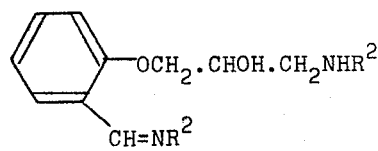

wherein $R^2$ has the meaning stated above, which is initially obtained as intermediate, whereafter if required the product obtained in free-base form may be reacted with an acid in order to form an acid-addition salt.

The reaction may be carried out at a temperature of up to 110°C., it may be carried out at atmospheric pressure or at an elevated pressure, for example by heating in a sealed vessel, and it may be carried out in a diluent or solvent, for example methanol, ethanol or an excess of the amine of the formula $R^2NH_2$.

The hydrolysis of the intermediate compound initially obtained may be carried out in an acid, for example by heating with an aqueous mineral acid, for example aqueous hydrochloric acid.

As stated above, the alkanolamine derivative of the invention possesses β-adrenergic blocking activity. When this activity is measured by the inhibition of isoprenaline-induced tachycardia in anaesthetised cats, the compound 1-o-formylphenoxy-3-t-butylamino-2- propanol has an ED$_{50}$ of 8.5, and the compound 1-o-formylphenoxy-3-isopropylamino-2-propanol has an ED$_{50}$ of 17, on a scale on which the commercially-available β-adrenergic blocking agent propranolol has an ED$_{50}$ of 62, and a compound described as one of the preferred compounds in United Kingdom Specification No. 1,069,345, namely 1-m-tolyloxy-3-isopropylamino-2-propanol (which compound is commercially-available in Germany), has an ED$_{50}$ of 81. At doses of the compounds of the present invention which produce effective β-adrenergic blockage in cats, no symptoms of toxicity are apparent.

According to a further feature of the invention there is provided a pharmaceutical composition comprising as active ingredient at least one alkanolamine derivative of the invention or an acid-addition salt thereof, in association with a pharmaceutically-acceptable diluent or carrier therefor.

A suitable composition is, for example, a tablet, capsule, aqueous or oily solution or suspension, emulsion, injectable aqueous or oily solution or suspension, dispersible powder, spray or aerosol formulation.

The pharmaceutical composition of the invention may contain, in addition to the alkanolamine derivative of the invention, one or more drugs selected from sedatives, for example phenobarbitone, meprobamate, chlorpromazine and the benzodiazepine sedative drugs, for example chlordiazepoxide and diazepam; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol; cardiotonic agents, for example digitalis preparations; and hypolipidaemic agents, for example clofibrate.

It is expected that the alkanolamine derivative of the invention would be given to man at a total oral dose of between 25 mg. and 1,200 mg. daily at doses spaced at 6–8 hourly intervals, or at an intravenous dose of between 1 mg. and 25 mg. A preferred oral dosage form is a tablet or capsule containing between 25 and 200 mg., and preferably 50 mg. or 100 mg., of active ingredient. A preferred intravenous dosage form is a sterile aqueous solution of the alkanolamine derivative or of a non-toxic acid-addition salt thereof, containing between 0.05 percent and 1 percent w/v of active ingredient, and more particularly containing 0.2 percent w/v of active ingredient.

The invention is illustrated but not limited by the following Examples:

EXAMPLE 1

A mixture of 2,3-epoxy-1-(o-formylphenoxy)propane (5 g.) and t-butylamine (100 ml.) is heated under reflux for 20 hours and then cooled and evaporated to dryness. The residual oil, which consists of 1-o-(t-butyliminomethyl)-phenoxy-3-t-butylamino-2-propanol, is dissolved in concentrated aqueous hydrochloric acid (100 ml.) and the mixture is heated under reflux for 8 hours and then cooled and evaporated to dryness under reduced pressure. The residue is dissolved in water and the solution is made alkaline with sodium carbonate and then extracted with chloroform. The extract is dried and evaporated to dryness and the residue is crystallised from cyclohexane. There is thus obtained 1-o-formylphenoxy-3-t-butylamino-2-propanol, m.p. 95°–97°C.

EXAMPLE 2

The process described in Example 1 is repeated except isopropylamine is used in place of t-butylamine. There is thus obtained 1-o-formylphenoxy-3-isopropylamino-2-propanol as an oil, the hydrogen oxalate salt of which has m.p. 122°–125°C. after crystallisation from acetone.

What we claim is:

1. An alkanolamine derivative selected from a compound of the formula:

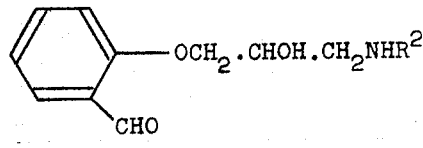

where R$^2$ is isopropyl, s-butyl, or t-butyl, and a hydrochloride; hydrobromide, phosphate, sulphate, oxalate, lactate, tartrate, acetate, salicylate, citrate, benzoate, β-naphthoate, adipate or 1,1-methylene-bis-(2-hydroxy-3-naphthoate) salt thereof.

2. The compound 1-o-formylphenoxy-3-isopropylamino-2-propanol or a hydrochloride, hydrobromide, phosphate, sulphate, oxalate, lactate, tartrate, acetate, salicylate, citrate, benzoate, β-naphthoate, adipate or 1,1-methylene-bis-(2-hydroxy-3-naphthoate) salt thereof.

3. The compound 1-o-formylphenoxy-3-t-butylamino-2-propanol or a hydrochloride, hydrobromide, phosphate, sulphate, oxalate, lactate, tartrate, acetate, salicylate, citrate, benzoate, β-naphthoate, adipate or 1,1-methylene-bis-(2-hydroxy-3-naphthoate) salt thereof.

* * * * *